United States Patent
Wullich et al.

(10) Patent No.: US 8,243,664 B2
(45) Date of Patent: Aug. 14, 2012

(54) ADAPTIVE HISTORY AWARE BEAM STEERING

(75) Inventors: Volker Wullich, Stuttgart (DE); Oliver Kraemer, Ostfildern (DE)

(73) Assignee: Sony Deutschland GmbH, Berlin (DE)

( * ) Notice: Subject to any disclaimer, the term of this patent is extended or adjusted under 35 U.S.C. 154(b) by 1073 days.

(21) Appl. No.: 12/120,734

(22) Filed: May 15, 2008

(65) Prior Publication Data
US 2008/0310380 A1    Dec. 18, 2008

(30) Foreign Application Priority Data
Jun. 12, 2007   (EP) .................................. 07110084

(51) Int. Cl.
*H04W 4/00*   (2009.01)
(52) U.S. Cl. ........................ 370/329; 370/338
(58) Field of Classification Search .......... 370/328, 370/329, 338; 455/68, 277.1, 562
See application file for complete search history.

(56) References Cited

U.S. PATENT DOCUMENTS

| | | | | |
|---|---|---|---|---|
| 5,930,254 | A * | 7/1999 | Liron et al. ................ | 370/238.1 |
| 7,606,159 | B2 * | 10/2009 | Dalal et al. .................. | 370/237 |
| 2002/0132600 | A1 * | 9/2002 | Rudrapatna ................ | 455/277.1 |
| 2006/0073850 | A1 * | 4/2006 | Cha et al. .................. | 455/562.1 |
| 2006/0116092 | A1 * | 6/2006 | Uno et al. .................. | 455/134 |
| 2009/0059958 | A1 * | 3/2009 | Nakata ....................... | 370/474 |
| 2009/0156130 | A1 * | 6/2009 | Wang et al. ................ | 455/68 |

FOREIGN PATENT DOCUMENTS

| | | |
|---|---|---|
| JP | 2001-007747 | 1/2001 |
| WO | WO 03/077480 A1 | 9/2003 |
| WO | WO 2004/062178 A2 | 7/2004 |
| WO | WO 2005/088914 A1 | 9/2005 |

\* cited by examiner

*Primary Examiner* — Chi Pham
*Assistant Examiner* — Farah Faroul
(74) *Attorney, Agent, or Firm* — Oblon, Spivak, McClelland, Maier & Neustadt, L.L.P.

(57) ABSTRACT

The present invention relates to the field of multi-path wireless communication. The present invention provides a system for assisting in providing a wireless communication link between a first communication device and a second communication device based on a plurality of communication paths comprising a history manager for providing, based on a recorded history of communication path states, a proposal for one or more communication paths based on which the communication link can be provided. The present invention further provides a corresponding method and a communication system and a communication device comprising the system of the present invention. Based on the proposal provided by the present invention, path switching can be performed more effectively, less and shorter interruptions of the communication link can be obtained and an enhanced transmission quality can be provided for multi-path wireless communication systems.

28 Claims, 4 Drawing Sheets

ADAPTIVE HISTORY AWARE BEAM STEERING

FIELD OF THE INVENTION

The present invention relates to the field of multi-path wireless communication. The present invention especially relates to system for assisting in providing a wireless communication link between a first communication device and a second communication device, especially relates to a communication system for providing a wireless communication link between a first communication device and a second communication device based on a plurality of communication paths comprising the first communication device, the second communication device and the system for assisting in providing a wireless communication link according to the present invention, especially relates to a first communication device for providing a wireless communication link with a second communication device based on a plurality of communication paths said first communication device comprising the system for assisting in providing a wireless communication link according to the present invention and especially relates to a method for providing a wireless communication link between a first electronic device and a second electronic device based on a plurality of communication paths.

DESCRIPTION OF THE RELATED PRIOR ART

In wireless communication system that support beam steering, the beam selection to switch to a new path between sender and receiver is usually performed randomly.

60 GHz communication devices for Wireless Personal Area Networks, for example, are often equipped with several directional antennas. For communication with each other, they can either rely on line-of-sight (LOS) connections, or in the more advanced case, utilize non-line-of-sight (NLOS) communication paths. A beam switching functionality located in the MAC layer and the physical layer thereby aims to determine the best communication path (often chosen to be the path with the lowest attenuation), which in most cases will be the direct LOS path. When the best path gets blocked, the communication devices randomly switch to another path.

In a living room scenario, a media player, like a HD BluRay player or a HD camcorder, may stream HD video to a display device like a LCD TV or projector. It may happen that a person walking through the living room may block not just one path, but several paths while crossing the room. This may lead to a significant interruption of the video stream, since multiple path interruptions and subsequent switches occur. The problem is exacerbated by the random beam switching/path selection algorithm that is performed. After detecting that one path is blocked, the communication devices randomly switch to another path which is working. However, when the obstacle is moving, the selected path may be the path that the obstacle crosses next, causing again a beam switch.

Of course, the same problems arises for other system than the exemplary 60 GHz Wireless Personal Area Network, other devices than the above described multimedia devices and other obstacles than a human obstacle.

Object of the present invention is therefore to provide enhanced transmission quality for wireless communication devices that use a plurality of communication paths for establishing a communication link.

BRIEF DESCRIPTION OF THE INVENTION

To solve the above problem the present invention provides a system for assisting in providing a wireless communication link between a first communication device and a second communication device based on a plurality of communication paths comprising a history manager for providing, based on a recorded history of communication path states, a proposal for one or more communication paths based on which the communication link can be provided.

The present invention provides a proposal for communication paths based on which the communication link can be provided. Therefore, path switching can be performed more effectively, less and shorter interruptions of the communication link can be obtained and an enhanced transmission quality may be provided.

Advantageously, said history comprises at least two communication path states corresponding to the same communication path and different instants or periods of time.

Advantageously, said history comprises at least two communication path states corresponding to two different communication paths and different instants or periods of time.

Advantageously, said history comprises information indicating the time order of said at least two communication path states.

Advantageously, said history comprises at least two communication path states corresponding to two different communication paths and the same instant or period of time.

Advantageously, a communication path state is a value indicating the capability of the communication path to transmit information at a given instant or period of time.

Advantageously, said history manager is adapted to repeatedly determine communication path states and to build up said history based on the determined communication path states.

Advantageously, the proposal is based on currently determined communication path states and previously determined communication path states.

Advantageously, a communication path state is a binary value indicating if the corresponding communication path is deemed blocked or not, said history comprises path state sequences, a path state sequence comprising information describing the order in which communication paths are blocked.

Advantageously, said history comprises path state sequences, whereby a path state sequence is a time ordered sequence of path state snapshots and a path state snapshot comprises communication path states corresponding to the same instant or period of time.

Advantageously, the history manager is adapted to enter a steady state when the determined communication path states do not change for a predefined amount of time or do not leave a range of tolerance for a predefined amount of time and to leave the steady state when not, whereby leaving the steady state marks the beginning of a path state sequence and/or entering the steady state marks the ending of a path state sequence.

Advantageously, in case a path state sequence currently obtained by the history manager agrees with a start sequence of a path state sequence recorded in said history, the proposal is based on the residual sequence of the stored path state sequence. In this case it is advantageous when, a communication path state is a binary value indicating if the corresponding communication path is deemed blocked or not and when communication paths which are deemed blocked in the first node of the residual sequence are excluded from the proposal. Further advantageous in this case is when said history comprises the frequency of occurrence of each of the path state sequence and, in case a plurality of matching start sequences, the proposal is based on the frequencies of occurrence of the corresponding residual sequences.

Advantageously, the system comprises a beam steering functional component adapted to select a communication path when a communication path currently used for providing the communication link is deemed blocked, whereby the selected communication path is used for further providing the communication link and the selection of the communication path is based on the proposal.

To solve the above object the present invention further provides a communication system for providing a wireless communication link between a first communication device and a second communication device based on a plurality of communication paths comprising the first communication device, the second communication device and the system for assisting in providing a wireless communication link according to the present invention.

To solve the above object the present invention further provides a first communication device for providing a wireless communication link with a second communication device based on a plurality of communication paths said first communication device comprising a system for assisting in providing a wireless communication link according to the present invention.

The present invention can likewise be seen in a method for providing a wireless communication link between a first electronic device and a second electronic device based on a plurality of communication paths comprising the step of providing, based on a recorded history of communication path states, a proposal for one or more communication paths based on which the communication link can be provided.

Advantageous embodiments of the method are defined in the respective dependent claims.

DESCRIPTION OF THE PREFERRED EMBODIMENTS

In the embodiment that will now be described, a prediction of communication path states in the future is made based on current communication path states and communication path states in the past, thereby are the path states modeled as binary values that indicate if a communication path is deemed blocked or not and the time order of path states is taken into account by considering sequences of path states.

Figure 1:
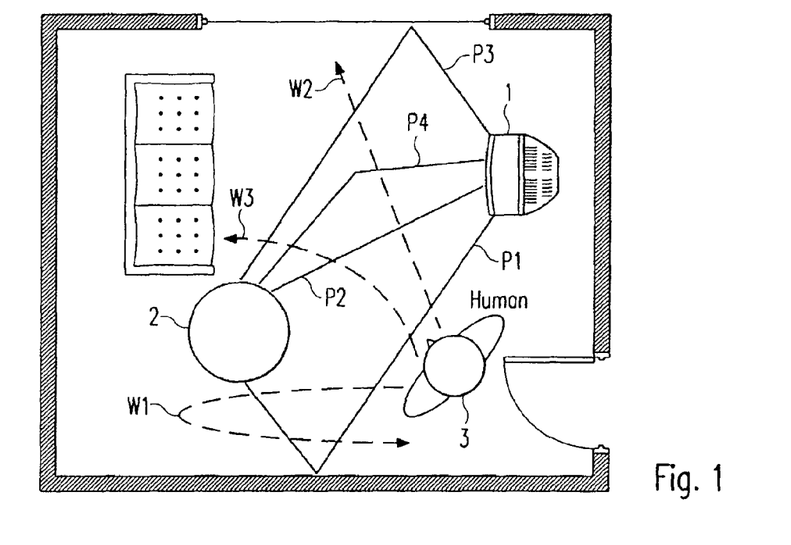
FIG. 1 shows a deployment scenario of the present invention.

FIG. 1 shows a deployment scenario of the present invention. In the scenario, the master device 1 and the slave device 2 are taken to be a TV and a camcorder, respectively. In the scenario, the communicating devices 1, 2 are semi-stationary (stationary for some amount of time). A stationary scenario is obtained, for example, when replacing the camcorder by a BluRay player fixed in a shelf. For (semi-)stationary communication devices 1,2 a prediction of the communication path states that will be blocked in future is easily made based on the communication path states in the past. A peer-to-peer wireless connection, working as a cable replacement, is established between the master 1 and the slave 2, which both may act as sending and receiving node. The master 1 is an embodiment of the second electronic device according to the present invention and the slave 2 is an embodiment of the first electronic device. The master 1 and the slave 2 are two nodes of a wireless communication network. The master 1 may establish connection with a plurality of slaves. Subject-matter related to a plurality of slaves however is not presented in the following. Handling of a plurality of slaves is state of the art and the skilled person is considered to readily apply the appropriate techniques including, for example, device identifiers and CSMA. Typically, the master device 1 will be a stationary device connected to mains power, and the slave 2 a portable, battery powered device. While, it is possible that a device is a master or a slave only, it is in most cases advantageous that the device has the ability to be master and slave and to dynamically change between master and slave status. Master 1 and slave 2 comprise all devices required for providing a wireless communication link, including, for example, transceiver units, all kinds of logic circuitry or control units and storage means, as is known in the art. The master 1 and the slave device 2 do communicate with each other via four possible paths P1 to P4. Path P2 is a line-of-sight path. Paths P1, P3 and P4 are non-line-of-sight paths, which correspond to radiation reflected at wall, window and ceiling or a room, respectively. Shown are further three typical ways W1, W2 and W3 a human 3 will walk. When walking along the paths, the human obstacle 3 will block the paths in characteristic sequences. The present embodiment therefore detects and records sequences of communication path states (including notably sequences of path blockades) and provides recommendations of paths to take when one or more of the communication paths get blocked based on the detected and recorded sequences.

A person walking from the door to the sofa may block paths P1, P2 and P3 in that sequence, a person leaving may cause a reverse blocked path sequence (P3, P2, P1). These blocked path events can be assumed to be caused by a moving object when they occur within an interval of several seconds (e.g. less than 10 seconds). In the embodiment, prediction of blocked paths is based on the frequency of occurrence of the various blocked path sequences. The accumulation of a certain sequence of blocked paths is interpreted such that the sequence will again occur with some probability. The more often a certain sequence occurs (relative to other sequences) the higher the probability. Hereby, it is assumed that such a sequence occurs with a certain probability the next time an initial sequence of a stored sequence is detected. Thus, in the above simple example, an improved beam steering algorithm avoids or will less likely switch to path P2 or P3 when initially path P1 gets blocked. This approach is based on the assumption that if more than one path is blocked over a short period of time by a moving object, the blocked path sequence will not be entirely random. Rather, the blocked path sequence will be determined by the layout of the room where the nodes 1,2 are used, the position and orientation of the nodes 1,2 and the movement pattern of the users 3. This heuristic approach does not guarantee that a selected path will not be blocked by shortly after the first path (P1 in the above example) has been detected to be blocked and a path switch has been triggered. However, through the path state history function, the probability of the necessity of a second path switch can be reduced.

Figure 2:
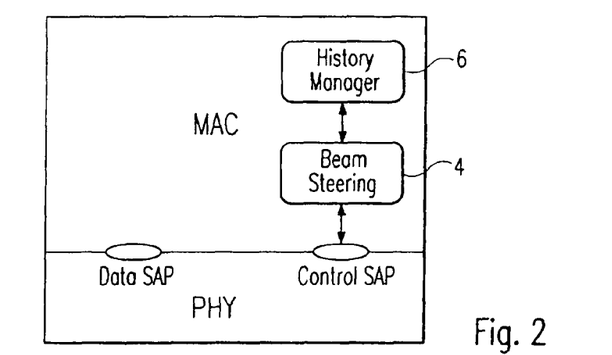
FIG. 2 shows a schematic view of the physical layer and the MAC layer according to an embodiment of the invention.

The embodiment is implemented within the physical layer (PHY) and the Media Access Control layer (MAC) shown schematically in FIG. 2. Data is transferred between the physical layer and the MAC layer via service access points (SAPs). A control SAP is provided for transfer of control (internal) data. A data SAP is provided for transfer of regular (payload) data. Located within the MAC layer is a beam steering functional component 4 and a history manager component 6. There is a slave and a master part of beam steering functional component 4 and of the history manager component 6. The history manager 6 is provided for the detection and storage of the path state sequences and the prediction of blocked paths. The beam steering functional component 4 controls the (main) direction of emission and reception of an antenna device. Hereby, the antenna device may comprise a plurality of antennas, each antenna arranged so as to provide a different (main) direction of emission and reception, whereby the direction of emission and reception is controlled by selecting the antenna from among the plurality of antennas which corresponds to the desired (main) direction of emission and reception, or the antenna device may provide a plurality of (main) directions of emission and reception by other means, for example by means of a variably phased array of antennas. While the embodiment uses antenna devices suitable for RF radiation, the present invention is not restricted to this and provides it advantageous effects also with "antenna devices" adapted to emit and receive other frequency ranges of the electromagnetic spectrum and even other types of radiation. More generally, the task of emitting and receiving radiation may therefore be performed by radiation emitters/field generators and radiation receivers/field sensors including, for example, LEDs and photo sensors or loudspeakers and microphones. In the present application, the (main) direction of emission and reception is called antenna direction, irrespective of whether or not the radiation emitter/field generator and radiation receiver/field sensor are or comprise an RF antenna. In the embodiment, the master 1 and the slave 2 are equipped with antenna devices providing a plurality of antenna directions and providing the same number of antenna directions. Generally it is possible however, that the master 1 and the slave 2 have a different number of antenna directions, including the case that only one of master 1 and slave 2 has a plurality of antenna directions (the other one having only one antenna direction). Thus it can be said that, generally, the slave 2 and the master 1 each comprise a radiation or field emitting and receiving device providing at least one direction of emission and reception, whereby at least one of said radiation or field emitting and receiving devices provides a plurality of directions of emission and reception and whereby each of the communication paths P1, P2, P3, P4 corresponds to a combination of a direction of emission and reception of the radiation or field emitting and receiving device of the slave 2 and a direction of emission and reception of the radiation or field emitting and receiving device of the master 1, whereby in the present embodiment both slave 2 and master 1 comprise a radiation or field emitting device providing a plurality of directions of emission and reception. The beam steering functional component 4 provides a functionality to determine all available communication paths (i.e. combinations of master and slave antenna directions).

Figure 3:
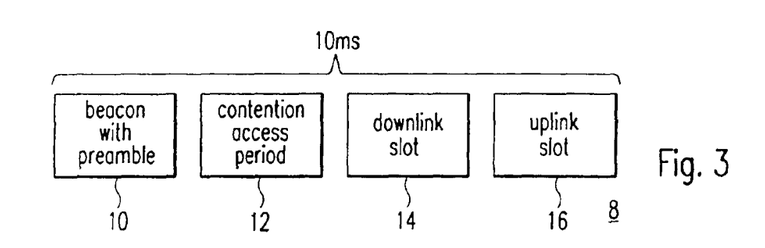
FIG. 3 shows the structure of a superframe according to the embodiment.

The MAC protocol of the embodiment defines superframes 8 of 10 ms length. FIG. 3 shows the structure of a superframe 8. The master 1 indicates the start of a superframe 8 by sending a beacon 10 periodically every 10 ms. The beacon 10 comprises a preamble portion known to the slave 2. A beacon 10 is considered successfully received by the slave 2 when the number of correctly received symbols of the preamble portion is higher or equal than a threshold. The beacon 10 is followed by a contention access period 12, during which nodes, e.g. the slave 2, which have successfully received the beacon 10 and are not known to the master 1 yet, do send a registration request to the master 1. Hereby, the master 1 receives the registration request with the same antenna directions used for sending the beacon 10 and the slave 2 sends the registration request with the same antenna direction used for receiving the beacon 10. When a beacon 10 is successfully received by the slave 2, the slave 2 knows with which antenna direction it can communicate with the master 1. When a registration request is received by the master 1, the master 1 knows with which antenna direction it can communicate with the slave 2. In order to locally (in each of master 1 and slave 2) establish full knowledge about the communication path, these two parts of information have to be exchanged between master 2 and slave 1. In the embodiment, this is achieved by coding the antenna direction used for sending a beacon 10 into the beacon 10 (i.e. the beacon 10 comprises antenna direction information) itself and by coding the antenna direction used for receiving the beacon 10 into the registration request (i.e. registration request comprises the antenna direction information). When a first communication path is determined, this path can be used to further bootstrap the communication between the master 1 and the slave 2, an example thereof being transmitting the path preference list described below from the slave 1 to the master 2.

A regular superframe 8 further comprises one downlink 14 and one uplink 16 communication slot for data transmission from master 1 to slave 2 and slave 2 to master 1, respectively. Within a superframe 8, the uplink slot 16 comes after the downlink slot 14. The uplink and downlink slots 14, 16 do not have to be symmetric (i.e. can have different lengths), thereby achieving variable and asymmetric transmission rate. In a save transmission mode, payload data received in an uplink slot 16 is acknowledged in a following downlink slot 14 and payload data received in a downlink slot 14 is acknowledged in a following uplink slot 16. Also, payload data and other data (e.g. management or control data, header data) may be transmitted encoded with an error detection code (e.g. data may be transmitted together with CRC checksum of data). Instead of having only one downlink 14 and one uplink slot per superframe 8, it is possible to have a plurality of downlink 14 and a corresponding number of uplink 16 communication slots per superframe 8.

Given the definition that n corresponds to the number of antenna directions of the slave 2, the master 1 sends n successive beacons 10 with a first antenna direction. Every beacon 10 of this n successive beacons 10 the slave 2 tries to receive with a different one of its n antenna directions. Thereafter, the master 2 sends n successive beacons 10 with a second antenna direction. Again, the slave 2 tries to receive every beacon 10 of this n successive beacons 10 with a different one of its n antenna directions. Continuing in this way, employing all antenna directions of the master 1, all combinations of antenna directions (i.e. all communication paths) are tested. This scheme is repeated periodically, so all combinations are tested periodically. Certainly, the order in which paths are tested may be different from the order just described. When during the above procedure, the slave 2 detects a communication path that seems to be better suited to bootstrap the communication with the master 1 than the first path detected, it simply sends a further registration request to the master 1. Alternatively to sending a registration request in response to the first successfully received beacon and in response to the following even better received beacons, the slave 2 may just determine the best communication paths during the initial search for communication paths just. Then, when the initial search is finished (i.e. after all possible paths are tested once), the slave 2 chooses the best one to initiate the communication. When the best path is chosen, the slave 2 tries to transmit the path preference list described below from the slave 2 to the master 1. The slave 2 may for example try do so during the contention access period of the best communication path.

Both of master 1 and slave 2 can initiate a connection. If the slave 2 is the initiator, it uses the contention access period to send a connection request to the master 1, which in turn assigns a number of up- and downlink communication slots 14, 16 to the slave 2. The assigned upstream slots will be used for communication to the master 1 by the slave 2 from that point onward. If the master 1 is the initiator, it assigns a number of up- and downlink communication slots 14, 16 to the slave on its own. The slave 2 can determine whether it receives beacons 10 from the master via other paths than the currently active path and scanning for operable communication paths is continued by the slave 2 also during times when a connection is established.

In addition to regular superframes 8, beacon superframes comprising a plurality of beacon 10 and contention access period 12 pairs are defined. Beacon superframes help to reduce latency of the system. As an example, for devices with 16 antenna directions each, a complete scan takes 16*16*10 ms=2.560 s when based on regular superframes 8 only. All antenna direction combinations may possibly be tested within a single beacon superframe. Beacon superframes preferably have the same length as regular superframes 8. Longer or shorter length is possible, however. Beacon superframes 18 may or may not comprise up and downlink slots 14, 16. The system may change dynamically back and forth from a regular mode to a low latency mode, the latter employing beacon superframes.

The slave 2 measures the channel quality of each possible communication path. Inter alia, the slave 2 hereby decides if a path is considered as blocked or not. As stated above, the beacons 10 comprise a preamble portion which is known to the slave 2. A path is considered as blocked by the slave 2 when the number of correctly received symbols of the preamble portion is below a threshold, when a CRC (or other error detection code) indicates an (e.g. irrecoverable) corruption of data received from the master 1 and when data that is expected to be received by the slave 2 fails to be received (e.g. acknowledgment for send data is not received). The latter two ways are possible only for active communication paths, whereas the first is possible for all possible communication paths. Not being able to perform channel quality measurements based on the preamble portion, the master 1 only measures the channel quality of active paths. Inter alia, the master 1 hereby decides if a path is considered as blocked or not. A path is considered to be blocked by the master 1, when a CRC (or other error detection code) indicates an (e.g. irrecoverable) corruption of data received from the slave 2 and when data that is expected to be received by the master 1 fails to be received (e.g. acknowledgment for send data is not received). Additionally, known preamble portions (the same as in the beacon or different ones) may also be send during the uplink and downlink communication slots 14, 16 by the slave 2 and the master 1, respectively. In this case, master 1 and slave 2 perform channel quality measurement for the active path based on the preamble portions in the uplink 14 and downlink 16, respectively. Hereby, the path is considered to be blocked by the master 1 when the number of correctly received symbols of the preamble portion of the uplink 14 is below a threshold value and the path is considered to be blocked by the slave 2 when the number of correctly received symbols of the preamble portion of the downlink 16 is below a threshold value.

Figure 5:
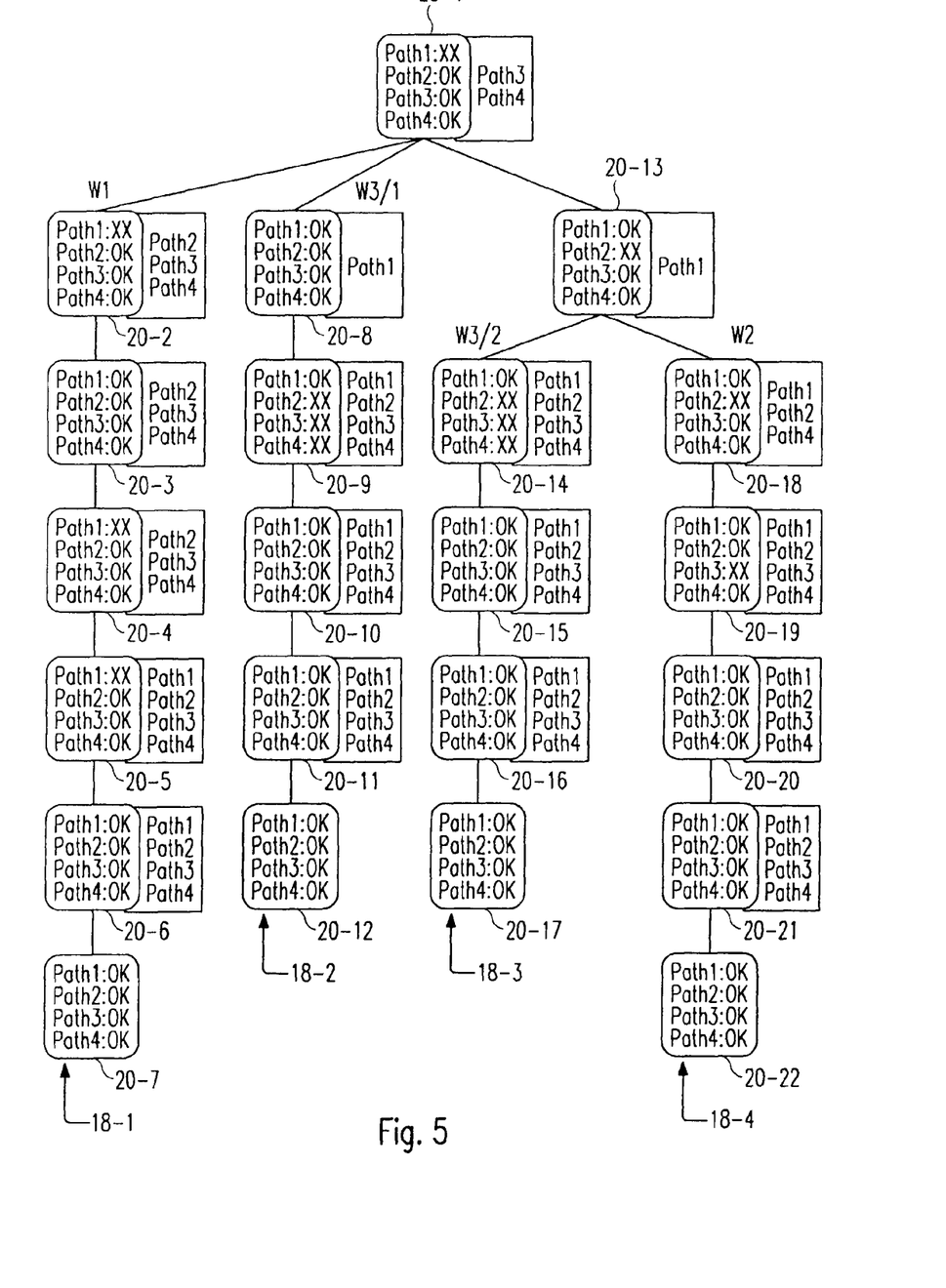
FIG. 5 shows an example of path state sequences obtained according to the embodiment of the present invention.

The history manager 6 performs two tasks in parallel; it builds up a database of path state sequences and provides recommendations for the beam switching at the same time. In the present embodiment, these tasks are performed by the slave part of the history manager 6 and storage means (e.g. RAM) for holding the database is provided by the slave 2. In the present embodiment, snapshots of the state of the communication paths are taken at a rate of $1/\Delta T$ (the length of the time unit $\Delta T$ is chosen in accordance with the implementation of the beam steering functionality) and the path state sequences are given by strings or sequences of successive path state snapshots. A snapshot comprises the communication paths with their current status (i.e. whether they are blocked or not). As the master 1 and the slave 2 determine the path state independently and the history manager 6 is located at the slave 2, the current status is advantageously taken to be the communication path status as determined by the slave 2. It is possible, however, to take into account also the communication path status as determined by the master 1. This requires transmitting the status as seen by the master 1 to the slave 2. FIG. 5 which will be explained later shows examples 18-1, 18-2, 18-3, 18-4 of path state sequences.

In order to record a path state sequence, the history manager 6 detects when a sequence starts, when a sequence ends and the single elements of a sequence. As noted above, the elements of a sequence are given by the snapshots. In order to find the possible start of a sequence, the present embodiment relies on a model of a steady state. The communication system is considered to be in a steady state when the set of paths that can be used for communication (i.e. the set of unblocked paths) has not changed for a predefined number t of time units $\Delta T$. When this condition is met, the history manager 6 is in steady state. When the history manager 6 is in the steady state and recognizes a snapshot different (e.g. comprising a further blocked path) from the snapshot of the steady state, it determines whether there is already a path state sequence stored in the database with the same starting snapshot. The database stores or otherwise provides access to a list of starting snapshots, hence, the history manager 6 must only determine if the current snapshot is already in the list of starting snapshots. If yes, the history manager 6 goes to the existing entry in the list, which means that the entry becomes the current node. If not, the history manager 6 creates a corresponding new entry in the list and goes to the new entry, which means that the new entry becomes the current node. Within the list, snapshots of sequences having the same starting snapshot are stored in a tree structure. The starting snapshot corresponds to the root of a tree (the 0-th level of the tree structure). The snapshots taken one time unit $\Delta T$ after their corresponding root snapshot correspond to the first level of the tree structure. The snapshots taken i time units $\Delta T$ after their corresponding root snapshot correspond to the i-th level of the tree structure. Every snapshot in a tree structure corresponds to a node of the tree structure. The starting snapshot corresponds to the root node. A node at the i+1-th level is a child node of a parent node at the i-th level, whereby the child node and the parent node correspond to snapshots of the same sequence. All nodes that stem directly or indirectly from a parent node are descendant nodes (child nodes, child nodes of child nodes, etc.) of the parent node. A node without a child node is a leaf node.

The history manager 6 maintains the database of path state sequences and compares the stored sequences with the currently ongoing sequence.

After the starting snapshot is found or created in the list of starting snapshots, the history manager 6 checks for each new snapshot whether or not the new snapshot is equal to one of the child nodes of the current node. If not, the history manager 6 creates a new child node corresponding to the new snapshot. In both cases, the history manager (re)calculates the best paths of the current node and then goes to the child node, which thereby becomes the current node. By doing so, the tree is constantly growing until it is determined that the end of a sequence is reached. The embodiment employs two conditions to detect the end of a path state sequence. According to the first condition, the end of a sequence is reached when the history manager 6 goes back into the steady state. This is the main end condition for a path state sequence. According to the second condition, the end of a sequence is reached when the length of a sequence exceeds a predefined maximum path state sequence length. This end condition is used to prevent the history manager from creating endless path state sequences.

During creation and running through the path state sequence tree, there is a list of best paths generated for each node in the tree except the leaves. An example of a best path, is the path that will most likely not be blocked when switched to. Another example is the path that provides for the least number of subsequent path switches. These criteria may be combined in a plurality of ways. Other definitions of the best path or best paths are possible, as will be readily acknowledged by the skilled-person. The list of best paths may comprise none, one or more paths or all paths. The list may comprise information indicating the "goodness" of each path. For example, the paths may be ordered according to their "goodness" (e.g. best first) or each path in the list has an associated indicator value indicating the path's "goodness". The indicator can be seen as providing a strength of proposal or strength of recommendation. The determination of the best paths is based on a statistical evaluation of previously recorded path state sequence data. A parent node's list of best paths is determined based on the path state snapshots of the parent node's descendant nodes and the frequency at which these descendant nodes occurred. Child nodes will typically be more important than indirect descendant nodes and taking into account only child nodes is possible and provides for a more simple yet effective implementation. As the path list is dependent on the frequency of occurrence of a child node, an indicator or counter of the frequency is stored associated with the node.

Every time the history manager 6 comes to a node with a list of best paths, the history manager 6 provides the list to the slave's part of the beam steering functional component 4 as a recommendation for paths to take. The beam steering functional component 4 utilizes the list's information as decision guidance in conjunction with other factors like channel quality.

Figure 4:
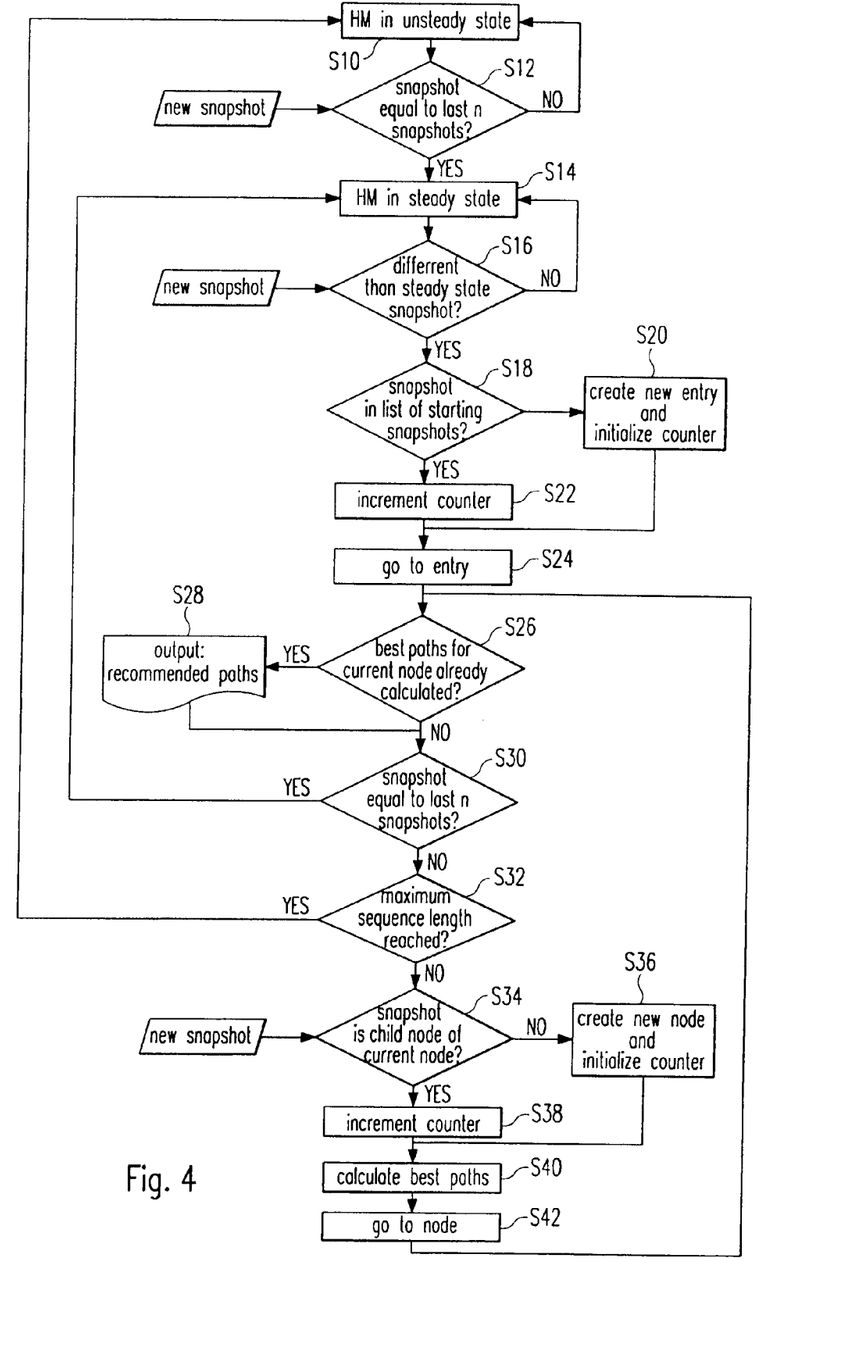
FIG. 4 shows a flow diagram for determining path state sequences and path proposals according to the embodiment of the present invention.

FIG. 4 shows a flow chart which provides a more detailed description of the operation of the history manager 6.

In a beginning step S10, the history manager 6 is in an unsteady state and proceeds to step S12.

In step S12, at first, a new snapshot, which becomes the current snapshot, is determined by the history manager 6. Then, the history manager 6 determines whether the current snapshot is the same as the last n snapshots. If, no the history manager 6 remains in the unsteady state and proceeds to step S10. If yes, the history manager 6 enters the steady state, the current snapshot becomes the steady state snapshot and the history manager 6 proceeds to step S14.

In step S14, the HM is in the steady state and proceeds to step S16.

In step S16, at first, a new snapshot, which becomes the current snapshot, is determined by the history manager 6. After this, the history manager 6 determines whether the current snapshot is different from the steady state snapshot. If no, the history manager 6 remains in the steady state and returns to step S14. If yes, the HM enters a third state and the proceeds to step S18.

In step S18, the history manager 6 determines if an entry corresponding to the current snapshot is already in the list of starting snapshots. If no, the history manager 6 proceeds to step S20. If yes, the history manager proceeds to step S22.

In step S20, the history manager 6 creates a new entry (root node) corresponding to the current snapshot in the list of starting snapshots, initializes the counter of the new entry and proceeds to step S24.

In step S22, the history manager 6 increments the counter of the entry corresponding to the current snapshot and proceeds to step S24.

In step S24, the history manager 6 goes to the entry (root node) corresponding to the current snapshot in the list of starting snapshots. In other words, the root node corresponding to the current snapshot becomes the current node. After this, the history manager 6 proceeds to step S26.

In step S26, the history manager 6 determines if the list of best paths is already calculated for the current node. If yes, the history manager 6 provides the list to the slave's part of the beam steering functional component 4 in step S28 and proceeds to step S30. If no, the history manager 6 directly proceeds to step S30. Alternatively, in the latter case, the history manager 6 may provide a list to the beam steering functional component 4 of the slave 2 indicating that all paths are "equally good" and then proceed to step S30.

In step S30, the history manager 6 determines whether the current snapshot is the same as the last n snapshots. If yes, the history manager 6 enters the steady state, the current snapshot becomes the steady state snapshot and the history manager 6 returns to step S14. If no, the history manager 6 proceeds to step S32.

In step S32, the history manager 6 determines whether the maximum path state sequence length is reached. If yes, the history manager 6 enters the unsteady state and returns to step S10. If no, the history manager 6 proceeds to step S34.

In step S34, at first, a new snapshot, which becomes the current snapshot, is determined by the history manager 6. Then, the history manager 6 determines whether the current snapshot is one of the child nodes of the current node. If yes, the history manager 6 proceeds to step S38, if no the HM proceeds to step S36.

In step S36, the history manager 6 creates a child node of the current node, whereby the created child node corresponds to the current snapshot, initializes the counter of the created child node and proceeds to step S40.

In step S38, the history manager 6 increment the counter of node corresponding to the current snapshot and proceeds to step S40.

In step S40 the history manager 6 calculates the list of best paths of the current node, stores the list and proceeds to step S42.

In step S42, the history manager 6 goes to the child node corresponding to the current snapshot. In other words, the child node corresponding to the current snapshot becomes the current node. After this, the history manager 6 returns to step S26.

Periodically, the beam steering functional component 4 of the slave 2 calculates (updates) a path preference list based on the most recent list of best paths. The path preference list comprises information indicating in which order communication paths are to be used when establishing a new communication link or when trying to uphold a communication link when an ongoing communication link is interrupted due to a blockade of the used communication path. The communication paths are ordered according to their estimated ability to support the communication link. Hereby, the communication path which is estimated to be best is first in the list. The order is based on the list of best paths, the channel quality/other path state information (e.g. current and/or historical signal attenuation, bandwidth and/or QoS parameters) and, eventually, communication link requirements (e.g. bandwidth, QoS parameters) specific to the communication link in question (requirements may be set by user or higher protocol layers). When the path preference list is updated, the slave 2 sends the list (or information necessary to update the list) to the master 1 (path preference list is transferred from the beam steering functional component 4 of the slave 2 to the beam steering functional component 4 of the master 1). Sending the path preference list may be omitted when the updated list is the same as the previous list.

Next, use of the path preference list is explained. The use is the same in case of establishing a communication link and in case of upholding (reestablishing) a communication link. As explained above, the master 1 and the slave 2 do determine the communication path state independently from each other. Let a first, a second and a third superframe be three successive superframes. When the master 1 or the slave 2 detects in the first superframe that the currently employed communication path is blocked, it switches to the next path of the path preference list, which will then be used for communication in the second superframe (In case that no path switching has been performed based on the currently available path preference list, the currently employed communication path is the first path of the path preference list, i.e. the first path of the path preference list is tried first). However, a communication path must remain fixed for at least two superframes. As the master 1 and the slave 2 perform path switching independently, one may switch while the other does not, which results in failing communication in the second superframe. This causes the device which has not yet switched to switch to the next path in the list. Thus, in the third superframe, the master 1 and the slave 2 will have set the same communication path. Of course, when both master 1 and slave 2 do detect that the currently employed communication path is blocked in the first superframe, both will switch to the next path of the path preference list in the second superframe and will consequently, have set the same communication path already in the second superframe. Switching of paths is continued until the communication link is (re)established, whereby the path preference list may be reused cyclically. However, if the communication link can not be (re)established within a given amount of time or if a given number of cycles of the path preference list is reached, the communication link is deemed broken. The path switching in the master 1 and the slave 2 is controlled by the beam steering functional component 4 of the master 1 and the slave 2, respectively.

Figure 6:
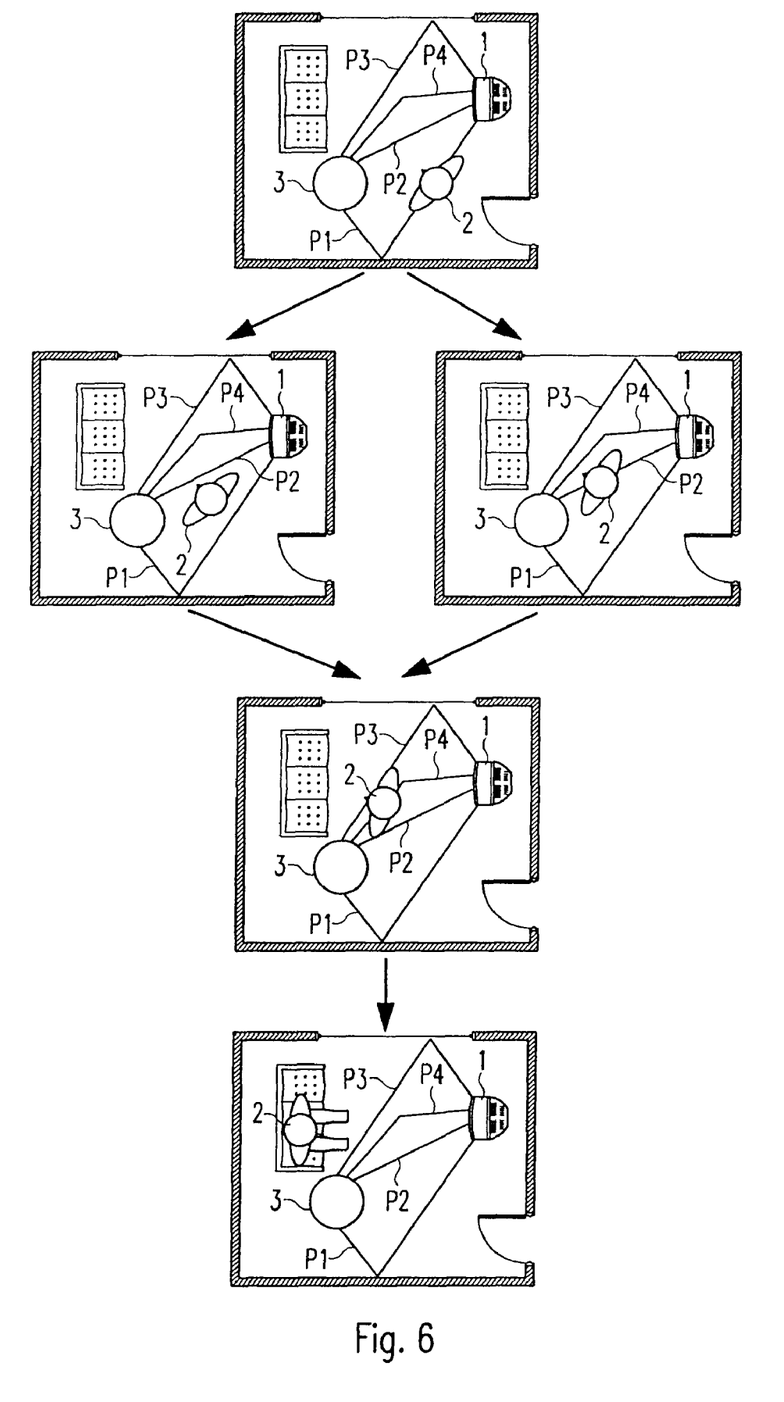
FIG. 6 shows a moving human causing path state sequences of FIG. 5.

FIG. 5 shows an example of four sequences 18-1 to 18-4. The sequence 18-1 is obtained by walking the way W1, the sequence 18-4 is obtained by walking the way W2, and the sequences 18-2 and 18-3 are obtained by walking the way W3. FIG. 6 shows the human 3 moving along the way W3 in two manners, differing in the speed the way is taken, thereby obtaining the sequences 18-2 and 18-3. Going back to FIG. 5. Every node 20 comprises the corresponding path state snapshot, showing the communication paths with their status. Every node 20 except the leaf nodes 20-7, 20-12, 20-17, 20-23 comprises the corresponding list of best paths. The value indicating the frequency of occurrence is not shown in FIG. 5. The sequences 18 have a common root node (starting snapshot) 20-1 with path P1 blocked and paths P2, P3 and P4 not blocked. Only paths P3 and P4 are not blocked in all of the child nodes 20-2, 20-8 and 20-13, therefore only paths P3 and P4 are recommended in the list of best paths of the root node 20-1. Paths P2, P3, and P4 are not blocked in any of the descendant nodes 20-3, 20-4, 20-5, 20-6 and 20-7 of the node 20-2 but path P1 is blocked some descendant nodes, therefore paths P2, P3 and P4 are recommended in the list of best paths of the node 20-2 and path P1 is not.

After a change of the orientation of the master 1 and/or the slave 2, blocked path events will occur in different sequences, since different communication paths will be established between master 1 and slave 2. This may, for example, be detected by movement/acceleration sensors with which the master 1 and slave 2 may be equipped and/or by detecting the modified physical properties of the communication paths. After detection of a different path set or a modified orientation, the recorded path states and the calculated lists of best paths are cleared and have to be re-established.

The present invention was explained with reference to a specific embodiment, this is by way of illustration only and it will be readily apparent to the those skilled in the art that various modifications may be made therein without departing from the scope of the following claims.

The invention claimed is:

1. A system for assisting in providing a wireless communication link, the system comprising:
 a first communication device; and
 a second communication device including
  a history manager that provides, based on a recorded history of communication path states, a proposal for one or more communication paths to establish the wireless communication link, and
  a storage unit that stores the recorded history of communication path states,
 wherein said history manager is configured to repeatedly determine communication path states and to build up said history based on the determined communication path states,
 a communication path state indicates whether the corresponding communication path is blocked or not, and
 said history comprises path state sequences, a path state sequence describing an order in which communication paths are blocked.

2. A system according to claim 1 wherein said history comprises at least two communication path states corresponding to the same communication path and different instants or periods of time.

3. A system according to claim 1 wherein said history comprises at least two communication path states corresponding to two different communication paths and different instants or periods of time.

4. A system according to claim 2 or 3 wherein said history comprises information indicating the time order of said at least two communication path states.

5. A system according to claim 1 wherein said history comprises at least two communication path states corresponding to two different communication paths and the same instant or period of time.

6. A system according to claim 1 wherein a communication path state is a value indicating the capability of the communication path to transmit information at a given instant or period of time.

7. A system according to claim 1 wherein the proposal is based on currently determined communication path states and previously determined communication path states.

8. A system according to claim 1 or 7 wherein
said history comprises path state sequences, wherein a path state sequence is a time ordered sequence of path state snapshots and a path state snapshot comprises communication path states corresponding to the same instant or period of time.

9. A system according to claim 8 wherein
the history manager is configured to enter a steady state when the determined communication path states do not change for a predefined amount of time or do not leave a range of tolerance for a predefined amount of time and to leave the steady state when not, whereby
leaving the steady state marks the beginning of at least one of a path state sequence or entering the steady state marks the ending of a path state sequence.

10. A system according to claim 8 wherein,
in case a path state sequence currently obtained by the history manager agrees with a start sequence of a path state sequence recorded in said history, the proposal is based on the residual sequence of the stored path state sequence.

11. A system according to claim 10 wherein
a communication path state is a binary value indicating whether the corresponding communication path is blocked or not and
communication paths which are deemed blocked in the first node of the residual sequence are excluded from the proposal.

12. A system according to claim 10 wherein
said history comprises the frequency of occurrence of each of the path state sequence and,
in case a plurality of matching start sequences, the proposal is based on the frequencies of occurrence of the corresponding residual sequences.

13. A system according to claim 1 further comprising
a beam steering functional component configured to select a communication path when a communication path currently used for providing the wireless communication link is blocked, wherein
the selected communication path is used for further providing the wireless communication link and
the selection of the communication path is based on the proposal.

14. A first communication device for providing a wireless communication link with a second communication device based on a plurality of communication paths comprising a system according to claim 1.

15. A communication system for providing a wireless communication link between a first communication device and a second communication device based on a plurality of communication paths comprising the first communication device, the second communication device and the system according to claim 1.

16. A method for providing a wireless communication link between a first electronic device and a second electronic device based on a plurality of communication paths, the method comprising the steps of:
providing, based on a recorded history of communication path states, a proposal for one or more communication paths to establish the wireless communication link,
repeatedly determining communication path states and building up said history based on the determined communication path states,
wherein a communication path state is a binary value indicating whether the corresponding communication path is blocked or not, and
wherein said history comprises path state sequences, a path state sequence describing an order in which communication paths are blocked.

17. A method according to claim 16 wherein said history comprises at least two communication path states corresponding to the same communication path and different instants or periods of time.

18. A method according to claim 17 wherein said history comprises at least two communication path states corresponding to two different communication paths and different instants or periods of time.

19. A method according to claim 16 or 17 wherein said history comprises information indicating the time order of said at least two communication path states.

20. A method according to claim 16 wherein said history comprises at least two communication path states corresponding to two different communication paths and the same instant or period of time.

21. A method according to claim 16 wherein a communication path state is a value indicating the capability of the communication path to transmit information at a given instant or period of time.

22. A method according to claim 16 wherein the proposal is based on currently determined communication path states and previously determined communication path states.

23. A method according to claim 16 or 22 wherein
a path state sequence is a time ordered sequence of path state snapshots and a path state snapshot comprises communication path states corresponding to the same instant or period of time.

24. A method according to claim 16 further comprising the step of entering a steady state when the determined communication path states do not change for a predefined amount of time or do not leave a range of tolerance for a predefined amount of time and leaving the steady state when not, wherein
leaving the steady state marks the beginning of a path state sequence and
entering the steady state marks the ending of a path state sequence.

25. A method according to claim 16 or 24 wherein,
in case a path state sequence currently obtained agrees with a start sequence of a path state sequence recorded in said history, the proposal is based on the residual sequence of the stored path state sequence.

26. A method according to claim 25 wherein
a communication path state is a binary value indicating if the corresponding communication path is deemed blocked or not and
communication paths which are blocked in the first node of the residual sequence are excluded from the proposal.

27. A method according to claim 25 wherein
said history comprises the frequency of occurrence of each of the path state sequence and,
in case a plurality of matching start sequences, the proposal is based on the frequencies of occurrence of the corresponding residual sequences.

28. A method according to claim 16 further comprising the step of
selecting a communication path when a communication path currently used for providing the wireless communication link is blocked, wherein
the selected communication path is used for further providing the wireless communication link and
the selection of the communication path is based on the proposal.

* * * * *